Jan. 7, 1930.  F. FOCHER, JR  1,743,032
LOCKING DEVICE FOR DIFFERENTIAL MECHANISM
Filed Nov. 30, 1926  5 Sheets-Sheet 1
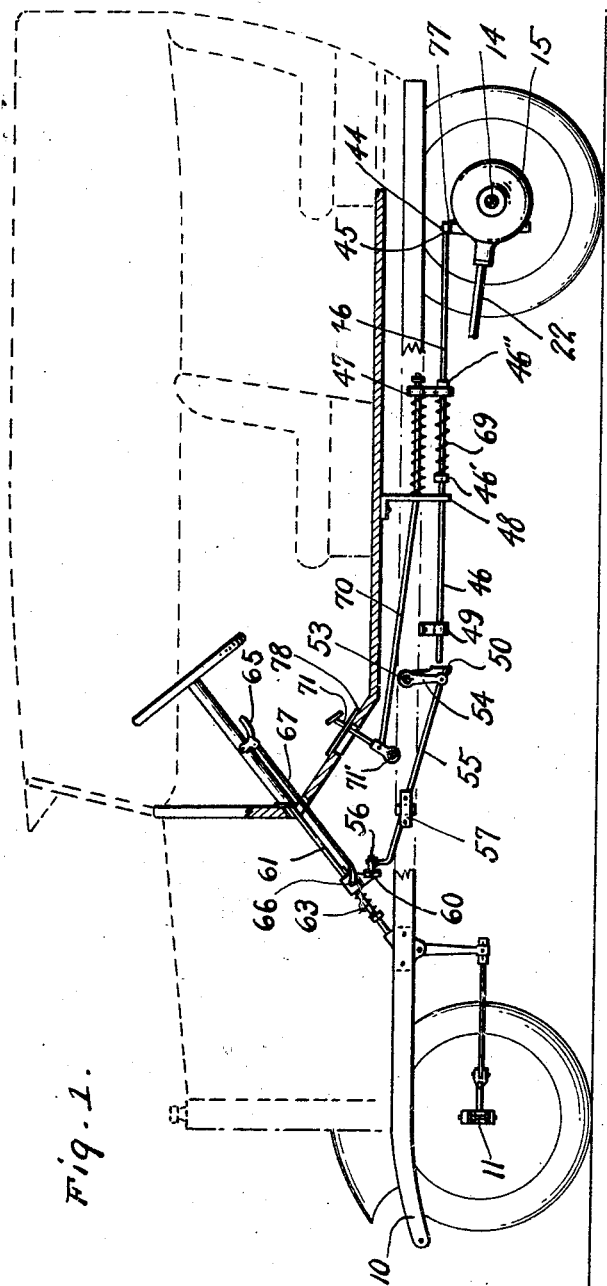
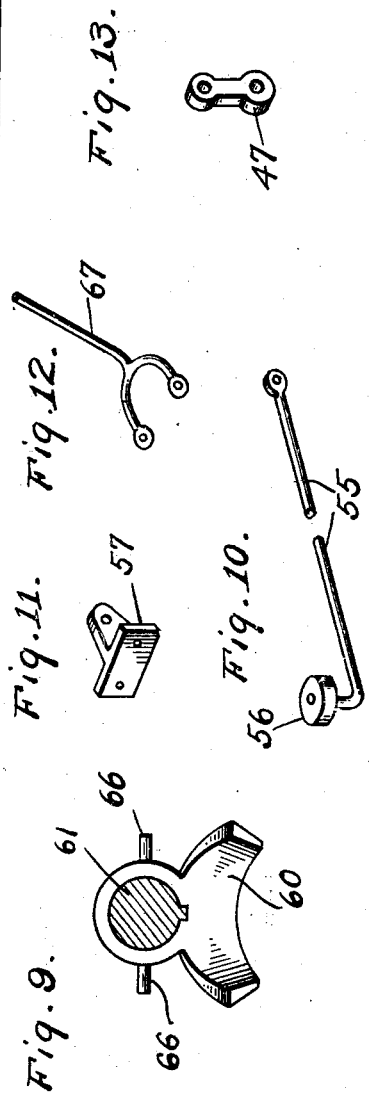
Frank Focher, Jr.
INVENTOR
BY Victor J. Evans
ATTORNEY
WITNESS: L. B. James

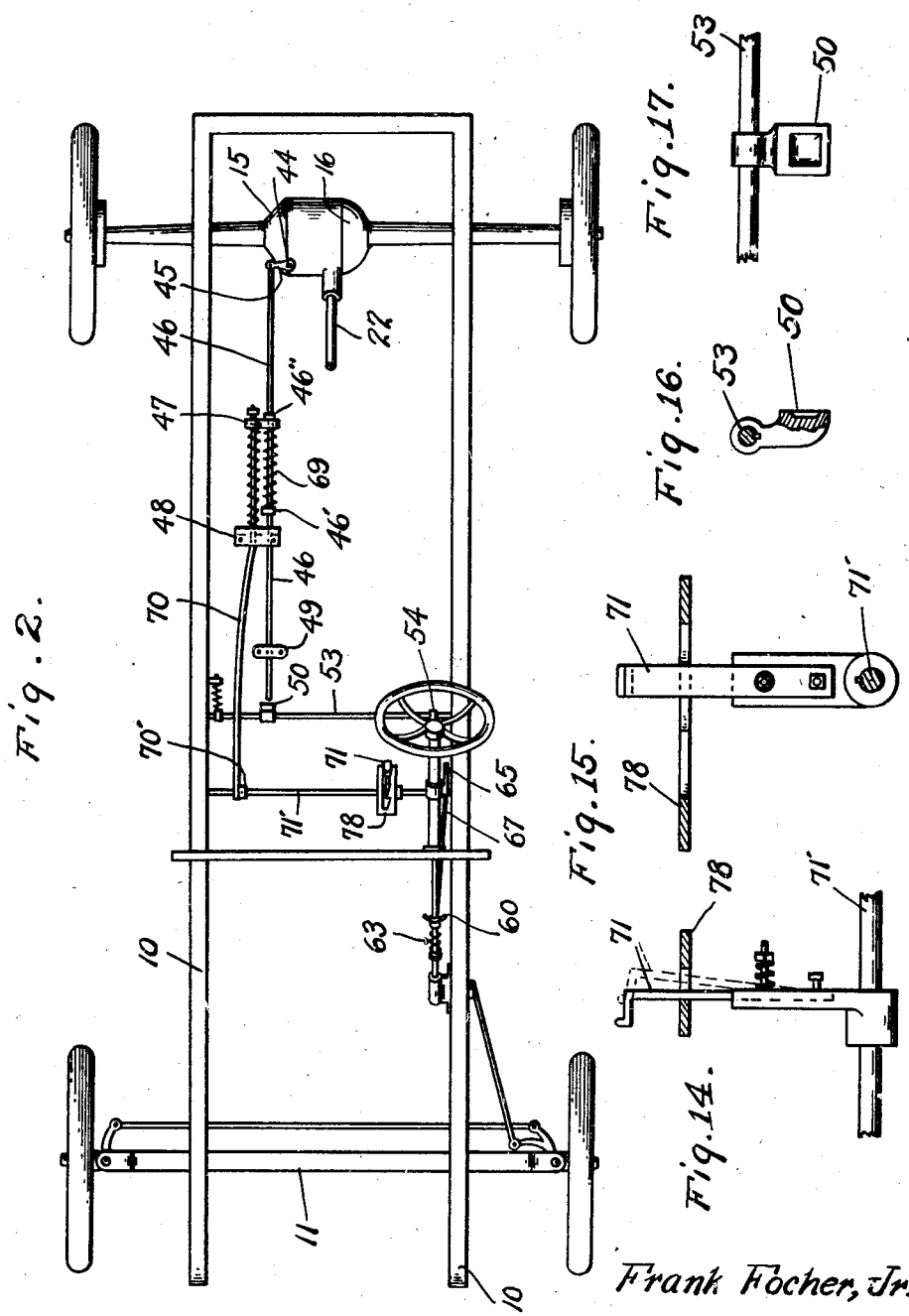

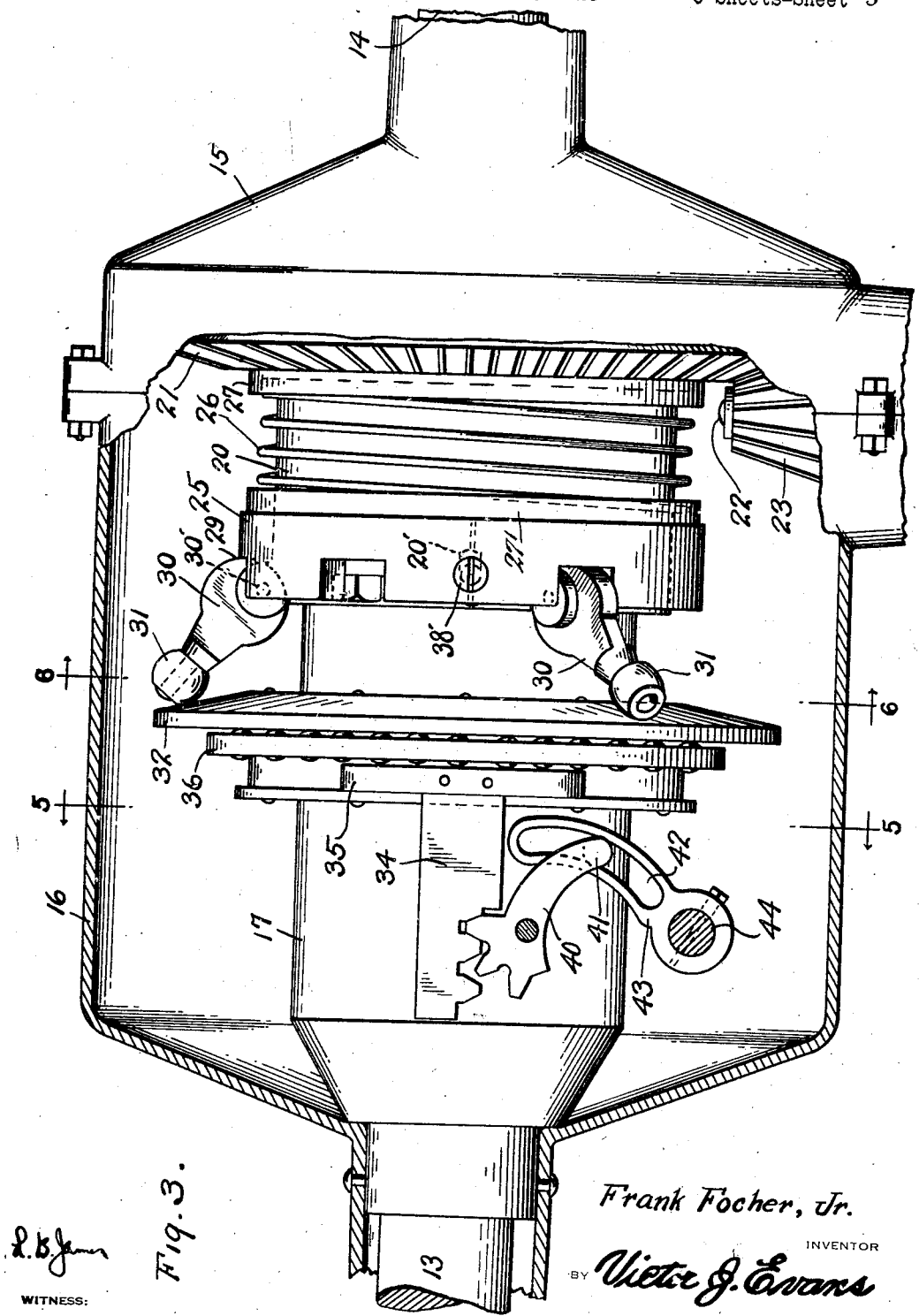

Jan. 7, 1930. F. FOCHER, JR 1,743,032
LOCKING DEVICE FOR DIFFERENTIAL MECHANISM
Filed Nov. 30, 1926 5 Sheets-Sheet 5

Frank Focher, Jr.
INVENTOR

Patented Jan. 7, 1930

1,743,032

UNITED STATES PATENT OFFICE

FRANK FOCHER, JR., OF GREAT FALLS, MONTANA

LOCKING DEVICE FOR DIFFERENTIAL MECHANISM

Application filed November 30, 1926. Serial No. 151,741.

The object of this invention is to provide simple, durable and effective means for locking or connecting the elements of the rear axle of a motor vehicle, so that they will rotate together when the car is being driven straight ahead, under favorable conditions and when there is no occasion for relative movement between the elements of the differential gearing.

A further object is to provide means for automatically releasing the retaining means, when the driver departs from a straight course of travel.

A further object is to provide for the direct control of the releasing means by the driver, the direct and automatic control being operable independently of each other.

A further object is to effect the automatic control from the steering wheel and without the addition of complicated mechanism, standard construction being employed so far as practicable.

A further object is to provide for the use of the elements of the rear axle as a single unit on either the forward or the reverse drive.

With the foregoing and other objects in view, the invention consists in the novel construction and arrangement of elements described, illustrated and claimed, it being understood that modifications may be made within the scope of the claims, without departing from the spirit of the invention.

In the drawings forming part of this application,

Figure 1 is a view longitudinally of a car body, with the operative mechanism of the differential locking means in elevation.

Figure 2 is a plan view of the frame, the front and rear axles and wheels being illustrated, and the means for controlling the lock either by a pedal or automatically from the steering pillar.

Figure 3 constitutes a horizontal section through the differential housing, with the elements of the lock in top plan.

Figure 4:
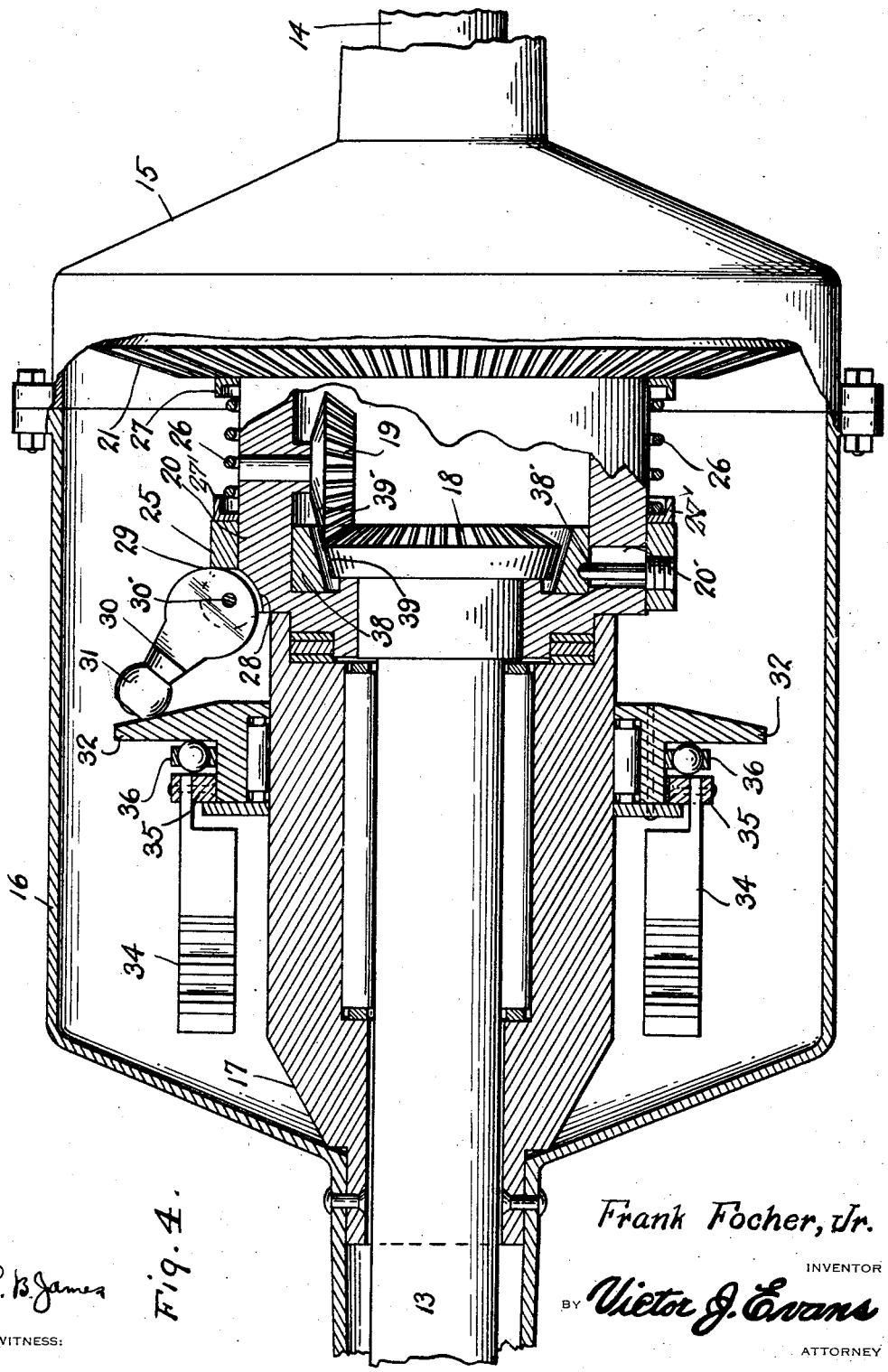

Figure 4 is a longitudinal section through the structure of Figure 3.

Figure 5:
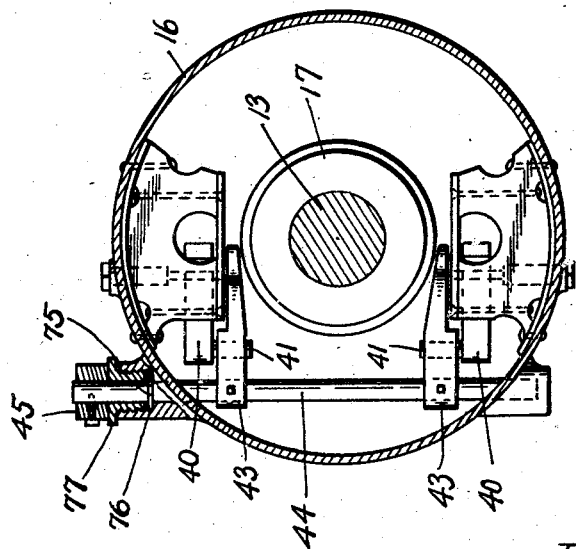

Figure 5 constitutes a section on line 5—5 of Figure 3.

Figure 6:
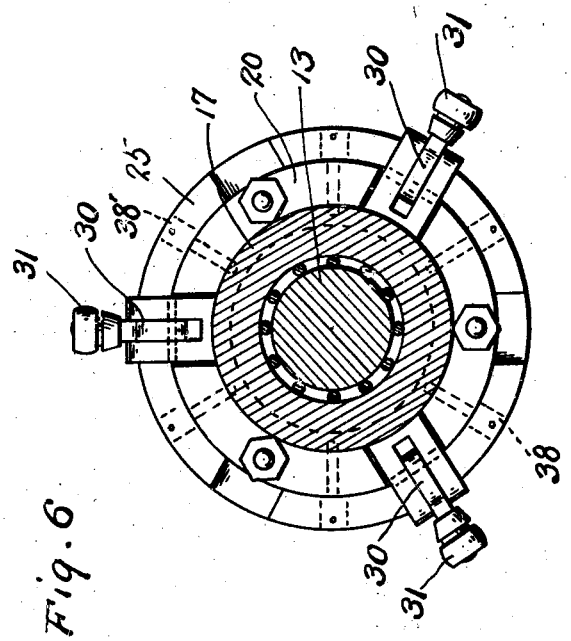

Figure 6 is a section on line 6—6 of Figure 3.

Figure 7:
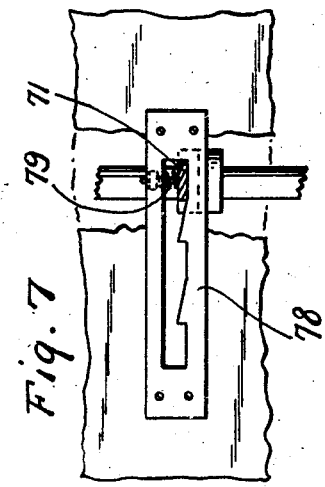

Figure 7 is a detail view showing a notched plate for retaining the pedal by means of which the lock may be controlled,—in operative or inoperative position.

Figure 8:
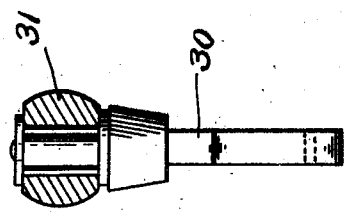

Figure 8 shows one of the rollers carried by the arms of Figures 3 and 6.

Figure 9 is a detail view showing a bracket to be mounted on a steering pillar for imparting thrust to means adapted to control the lock automatically, so that it may be thrown out whenever the driver is making a turn.

Figure 10 is a detail view of a rod carrying a roller and adapted to be controlled by the bracket of Figure 9.

Figure 11 is a view of a guiding element to be mounted on the frame and serving to partly support the arm of Figure 10.

Figure 12 is a perspective view of the forked arm by means of which the bracket of Figure 9 is moved downwardly in Figure 1 when the automatic control is thrown out.

Figure 13 is a view of one of the connecting elements or links of Figure 1.

Figure 14 is a detail view showing the pedal mounting means.

Figure 15 is a view of the same structure from another angle.

Figure 16 is a detail view of the shoe mounted on one of the transverse shafts of Figure 2 and by means of which thrust is imparted to a rod adapted to throw out the differential lock.

Figure 17 shows the element of Figure 16 from another angle.

The side bars of a frame of a motor car are shown conventionally and are designated 10, a front axle is shown at 11 and a rear axle comprises the elements 13 and 14. A housing of special construction includes element 15 and the main housing element 16. Connected with the latter and inclosed thereby is a body 17 of cylindrical or tubular form, this element surrounding the axle 13 and said axle being shown as mounting on the inner end thereof the gear wheel 18 with which pinions such as 19 mesh.

These pinions 19 are mounted in the sleeve or the hub portion or gear case 20 of the large gear wheel 21 of the differential mechanism. The end of a line shaft or drive shaft is shown in Figure 3 and is designated 22, and this shaft carries a beveled pinion 23 by means of which gear wheel 21 is driven.

Surrounding the sleeve 20 is a collar 25 and a flanged ring 27' is connected with this collar and abuts one end of a coiled spring 26, the opposite end of this spring engaging the flanged ring 27.

Formed on sleeve 20 are portions 28 permitting movement of the cam surfaces 29 of pivoted arms 30. These arms carry anti-friction roller 31, and the latter are engaged by the bevelled surface of a slidable ring 32 operating on sleeve 17, this ring being controlled by the elements shown at the left of Figure 3 and including toothed bars 34 connected with a plate or head 35, the latter operating against a thrust bearing shown at 36 in Figure 4, the elements of the bearing coperating with one flat surface of ring 32. The movement of elements 34 to the right of Figures 3 and 4 imparts movement to ring 32 and the arms 30 are operated about their pivotal points 30', and engage collar 25 (see Fig. 4), producing locking operation between the cooperating elements of the differential mechanism, so that this mechanism is rendered inoperative as a differential device, and the shaft elements 13 and 14 move together, when the machine is being driven on a straight course.

Within sleeve 20 a ring 38 is mounted, this ring having a bevelled or cone surface, on the inner side thereof for cooperation with a cone surface 39 on the gear wheel 18 and a bevelled surface 39' on pinion 19. The operation of arms 30, and the arrangement disclosed produces frictional engagement (by member 38) at 39 and 39' and results in the locking operation described.

Pins 38' extending through collar 25, and the slots 20' in element 20, permit the sliding movement of ring 38.

The bars 34, provided with teeth, as shown in Figure 3, are engaged by arms 40 having teeth meshing with the teeth of bars 34. These elements 40 carry rollers 41 adapted to engage slots 42 in arms 43 carried by shaft 44 and made rigid therewith. Shaft 44 extends vertically, as indicated in Figure 5, and carries a crank arm 45, shown in Figure 2, the latter being adapted for connection with rod 46 passing through the brackets or guiding elements 47, 48 and 49. The end of rod 46 is engaged by a shoe or the like 50, shown in detail in Figures 16 and 17 and also shown in Figure 1. This shoe is rigid on transverse shaft 53 and the latter is rocked by arm 54 connected with rod 55, the latter carrying a transverse bar, plate or the like, designated 56. Rod 55 passes through the guiding element 57 on one of the frame elements 10, this device 57 being illustrated in Figure 11.

Transverse element 56 is engaged by the curved bracket or sector 60, illustrated in detail in Figure 9 and mounted on the steering pillar 61, and being slidable thereon, or having splined connection therewith. Bracket 60 is in the position of Figure 1 when spring 63 is expanded, but this bracket may be moved downwardly to inoperative position, against the action of spring 63, when the operating lever 65 is shifted in the direction required for that purpose, lever 65 being connected with bracket 60, and especially with the pins 66 thereof, by means of forked arm or rod 67, showing in detail in Figure 12. Rod 46 carries collars 46', 46" and a spring 69 surrounds rod 46 between collar 46 and the element 47.

Also passing through and engaging element 47 is rod 70 controlled by pedal 71, the rod being guided by bracket 48. Pedal 71 rocks shaft 71' and arm 70' connected with rod 70.

The pedal 71 enables the driver, or operator to have control of the differential locking device by the pressure of the foot, and in view of the operative connection with the steering pillar, the differential lock is automatically controlled when the driver is making a turn or is guiding the machine out of a straight course in order to avoid other machines or obstacles of any character, such as rough places in the roadway. Spring 26 normally holds the differential lock inactive, but the elements 38 and 39 of Figure 4 are brought into frictional contact when thrust is imparted to the element 38, towards the right in Figure 4, and this movement is produced by the operation of pedal 71. If the locking mechanism including elements 38 and 39 are in engagement at a given time, the lock is automatically released, through the engagement by bracket 60 on steering pillar with element 56, imparting rearward thrust to bar 55, rocking shaft 53 and causing shoe 50 to engage the end of rod 46, thereby imparting rearward movement to rod 46 and rotating vertical stem or shaft 44, through which the mechanism at left Figure 3 is shifted as before described. Movement thereof in the required direction causes the release of arms 30, and the locking mechanism. It may be stated that stem or shaft 44 carries a collar 75 abutting a gasket 76, the latter being retained by a jamb nut 77.

Pedal 71 cooperates with the notched and slotted plate 78, and a spring 79 on one side of the pedal holds the pedal in engagement with any of the teeth of the notched plate, in accordance with the will of the operator, thereby enabling him to place the pedal and the locking mechanism controlled thereby in the position desired.

Having thus described the invention, what is claimed is:—

1. The combination with a rotatable element of a differential mechanism, said element including a sleeve and rotatable devices mounted in the sleeve, and a driven element controlled by the rotatable devices, of tapered engaging means slidable in the sleeve and against the rotatable devices therein, preventing their rotation, devices for automatically controlling the position of the engaging means, and devices for independently controlling the position of the engaging means, the tapered means contacting with the inner wall of the sleeve and with the driven element when engaging the rotatable devices in the sleeve.

2. The combination with a rotatable element of a differential mechanism, said element including a sleeve and rotatable devices mounted in the sleeve, and a driven element controlled by the rotatable devices, of taperd engaging means slidable in the sleeve and against the rotatable devices therein, preventing their rotation, and devices including an element of a steering mechanism for automatically controlling the position of the engaging means, these controlling devices also including an element carried by the sleeve and connected thru the latter with the tapered engaging means, and arms pivoted on and extending radially from the sleeve and imparting thrust to the element connected with the tapered means, forcing the latter between the bore of the sleeve and the rotatable devices, when engaging these devices.

3. The combination with a rotatable element of a differential mechanism, said element including a sleeve and toothed rotatable devices mounted in the sleeve, and a driven element controlled by the rotatable devices, of engaging means slidable in the sleeve and preventing the rotation of said devices therein, devices imparting thrust to the engaging means, and independently operable devices for controlling the position of the devices imparting thrust, the engaging means contacting with the inner wall of the sleeve when engaging the rotatable devices, producing wedging action between these devices and said inner wall.

4. In mechanism of the class described, an element of a steering device, a sector carried thereby and rotatable with said element, a differential mechanism, means for automatically controlling the differential mechanism by the position of the steering device and sector, and pedal operated means operating through a portion of the mechanism for the automatic control, for controlling the differential mechanism independently of the steering device.

5. The combination with a rotatable element of a differential mechanism, said element including a sleeve and rotatable devices mounted in the sleeve, and a driven element controlled by the rotatable devices, of engaging means slidable in the sleeve and preventing the rotation of said devices therein, devices for automatically controlling the position of the engaging means, and means for normally retaining the engaging means in inactive position.

In testimony whereof I affix my signature.

FRANK FOCHER, Jr.